United States Patent [19]

Abrams et al.

[11] Patent Number: 4,824,740
[45] Date of Patent: Apr. 25, 1989

[54] FUEL CELL STACK COOLING SYSTEM

[75] Inventors: Martin L. Abrams, Glastonbury; Daniel L. D'Aquila, South Windsor; Glenn W. Scheffler, Tolland, all of Conn.

[73] Assignee: International Fuel Cell Corporation, South Windsor, Conn.

[21] Appl. No.: 198,604

[22] Filed: May 9, 1988

Related U.S. Application Data

[63] Continuation of Ser. No. 62,040, Jun. 15, 1987, abandoned.

[51] Int. Cl.$^4$ ........................ H01M 8/04; H01M 2/00
[52] U.S. Cl. ........................ 429/24; 429/26; 429/34
[58] Field of Search ................ 429/22, 24, 26, 34

[56] References Cited

U.S. PATENT DOCUMENTS

| | | | |
|---|---|---|---|
| 3,539,397 | 10/1970 | Keating et al. | 429/26 X |
| 4,333,992 | 6/1982 | Healy | 429/26 X |
| 4,585,708 | 4/1986 | Abens et al. | 429/22 X |

FOREIGN PATENT DOCUMENTS 60-241670  11/1985  Japan .................................... 429/24

Primary Examiner—Stephen J. Kalafut
Attorney, Agent, or Firm—William W. Jones; Edward L. Kochey, Jr.

[57] ABSTRACT

Fuel Cell stack coolant water is processed by moving the two-phase water/steam coolant exhaust through a steam separator wherein the water phase is separated from the steam phase. The water phase is then moved through a heat exchanger where its temperature is lowered to a subcooled level which is below the coolant operating temperature in the stack. A flow control valve is associated with the coolant heat exchanger to regulate water flow through and/or around the heat exchanger depending on the temperature of the water which leaves the steam separator. By subcooling the coolant before it reenters the stack, a lessening of electrolyte loss through evaporation is achieved. By eliminating steam condensation as a form of system heat rejection, system engineering is simplified and construction costs are lowered.

6 Claims, 1 Drawing Sheet

FUEL CELL STACK COOLING SYSTEM

DESCRIPTION

This application is a continuation of Ser. No. 062040, filed June 15, 1987, now abandoned.

TECHNICAL FIELD

This invention relates to a system and method for cooling a fuel cell stack coolant liquid in a closed coolant recirculating loop. More particularly, this invention relates to a cooling system and method which does not involve steam condensation and wherein the coolant is cooled to a subcooled level prior to reintroduction into the stack.

BACKGROUND ART

Fuel cell stack power systems which use a water coolant will typically have the coolant in a two-phase water/steam mode throughout substantially the entire passage of the coolant through the stack. The temperature of the water in the two-phase coolant will be substantially constant as the coolant traverses th stack, with the percentage of steam increasing in the two-phase coolant from coolant inlet, to coolant outlet. The coolant thus remains in a substantially isothermal condition as it passes through the stack cooling passages. In order to preserve the isothermal nature of the coolant, systems cooled in this manner will typically utilize steam condensers and steam separators in concert so that the water will not significantly cool before it is returned to the stack. Thus, the coolant will be exhausted from the cooling passages of the stack as a two-phase water/steam mixture, will be passed to a steam condenser to condense more water out of the steam phase, and also passed to a steam separator where the steam and water phases will be separated, the steam going to a fuel reformer and the water going back to the coolant passages in the stack. The condenser and separator may be used in either order. Before returning to the stack, typically, makeup water will be mixed with the returning water, but the temperature of the returning water will not be lowered during this recycling more than a very few degrees. Thus, where the coolant water is returned to the stack, almost immediately it begins to boil creating more steam.

There are several problems which exist in the aforesaid fuel cell stack cooling system scheme. One of the problems relates to the handling of the steam phase and the fact that the steam condensers must be physically elevated above the steam separator, and the steam separators must be physically elevated above the cell stack. This creates packaging or housing problems for the fuel cell system relating to the necessary height of the housing in which the system is contained. This problem is particularly apparent with small to mid-range power systems. Another problem created by isothermal cooling of the fuel cell stacks occurs in cells which use aqueous electrolyte solutions, such as acid or alkaline cells. This second problem concerns the evaporation of electrolyte into the oxidation gas. This evaporated electrolyte leaves the cell area with the exhausted oxidant gas. Without special modifications to the cell structure, this will be a serious problem which is continuous at high load outputs. This requires electrolyte replacement, and special stack construction to combat corrosion in stack manifolds and the like.

DISCLOSURE OF INVENTION

This invention relates to a fuel cell stack cooling system which is nonisothermal and which does not involve steam condensation in rejecting heat from the coolant before returning it to the stack. The two-phase water/steam coolant exhausted from the stack cooling conduits is taken to a steam separator drum wherein the steam phase is separated from the water phase, with the steam phase being directed to a catalytic reformer wherein raw hydrocarbon fuel is reformed with steam into a hydrogen-rich fuel for consumption in the cells. The separated water phase is taken to a heat exchanger where the water temperature is lowered to a predetermined subcooled level before reentering the stack cooling passages. There is a bypass conduit which the water may flow through to bypass the heat exchanger, and a control valve which controls the flow path of the water with respect to the heat exchanger. Thus, after leaving the steam separator, all, some, or none of the water will flow through the heat exchanger, and the rest will bypass the heat exchanger, and then remix before reentering the stack. A temperature sensor is disposed downstream of the steam separator to continuously monitor the temperature of the water exiting from the steam separator. The sensor is connected to the power plant microprocessor control so that the latter can continuously adjust the control valve to maintain the proper water temperature for entry into the stack. Thus, when the water leaving the steam separator is hotter, the valve is adjusted to cause more water to flow through the heat exchanger, and when the water from the steam separator is cooler, the bypass flow path is taken. The subcooled water entering the stack is oriented in the stack to cause electrolyte vapor to condense out of the oxidant gas stream and return to the electrolyte matrix before the oxidant gas stream is exhausted from the stack. This condensation feature substantially increases the effective life of the electrolyte in the stack.

It is therefore an object of this invention to provide an improved fuel cell stack cooling system which does not isothermally cool the cells in the stacks.

It is an additional object of this invention to provide a cooling system of the character described which does not include the condensation of steam to reject heat in the coolant prior to returning the coolant to the stacks.

It is a further object of this invention to provide a cooling system of the character described wherein the two-phase water/steam mixture exhausted from the stack cooling passages is separated into its two phases and the water then subcooled before being returned to the stack.

It is another object of this invention to provide a cooling system of the character described wherein a control valve is provided to vary the proportion of water which is subcooled depending on the temperature of the water leaving the water/steam separator.

It is yet another object of this invention to provide a cooling system of the character described wherein vaporized electrolyte is condensed out of oxidant gases prior to the latter being exhausted from the fuel cells in the stacks.

These and other objects and advantages of this invention will become more readily apparent from the following detailed description of a preferred embodiment thereof when taken in conjunction with the accompanying drawings.

BEST MODE FOR CARRYING OUT THE INVENTION

Figure 1:
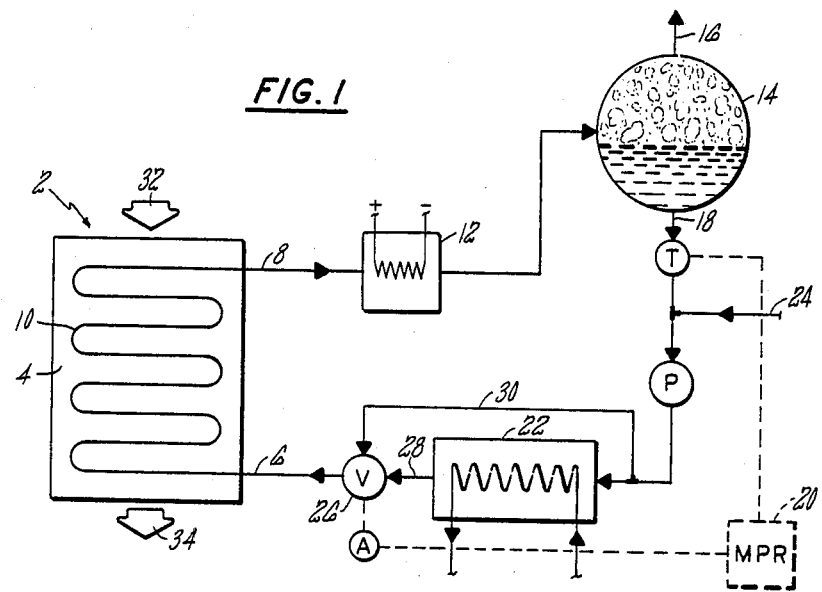
FIG. 1 is a schematic representation of fuel cell stack coolant circulating loop formed in accordance with this invention.

Referring now to FIG. 1, there is shown a preferred embodiment, in schematic form, of a fuel cell stack cooling recirculation loop which is formed in accordance with this invention. The cell stack is denoted generally by the numeral 2, and will be described as a phosphoric acid system, however, it will be noted that any aqueous electrolyte can be used with this invention. A cooling plate 4 is shown in the stack 2, with the water coolant entering the coolant plate 4 at inlet 6 and exiting the coolant plate 4 and exit 8, the inlet 6 and exit 8 being interconnected by a serpentine coolant flow passage 10. It will be, of course, understood that while only one coolant plate 4 is shown in FIG. 1, an actual stack will contain a plurality of such plates, and that the plate 4 could take the form of a plate which has a profiled passage or passages therein, or has coolant tubes associated therewith. The coolant will be in the form of a water/steam two-phase mixture as it leaves the exit 8. This two-phase mixture passes through a heater 12, shown as an electric heater, and thence to a water/steam separating drum 14. The purpose of the heater 12 is for use in start up and for low power load modes. The steam fraction of the two-phase mixture is drawn off in the separator 14 into a conduit 16 which will take the steam to a catalytic hydrocarbon fuel reformer (not shown). The water fraction is removed from the separator via conduit 18 where a temperature sensor T continuously monitors the temperature of the water leaving the separator 14. The sensor T feeds the water temperature data to a microprocessor control 20 which controls operation of the entire power plant. The separated water is pumped by a pump P to a heat exchanger 22 where the temperature of the water will be lowered to a subcooled level, that is to say a level which is below the saturation temperature corresponding to the stack cooling recirculation loop pressure. upstream of the pump P makeup water is added to the recirculation loop via conduit 24 to replenish water lost from the loop in the steam.

The heat exchanger 22 will preferably operate with a liquid or gaseous coolant. Between the heat exchanger 22 and the coolant inlet 6 there is disposed a control valve 26 which is operated, or modulated, by an actuator A governed by the microprocesssor 20. The valve 26 is a three way valve which is connected to the outlet conduit 28 from the heat exchanger 22, to the inlet 6, and to a bypass conduit 30 which will duct water around the heat exchanger 22. The microprocessor 20 continuously alters operation of the valve 26 in response to fluctuations in the temperature of the water sensed by the sensor T. The valve 26 thus apportions the water flowing through the heat exchanger 22 and through the bypass conduit 30 so that the water flowing through the inlet 6 will be at the targeted subcooled temperature. This means that when hotter water temperatures are sensed by the sensor T then the valve 26 will be adjusted to run more water through the heat exchanger 22, and when cooler temperatures are sensed at T, then the valve 26 will be adjusted to route more water through the bypass conduit 30.

Figure 2:
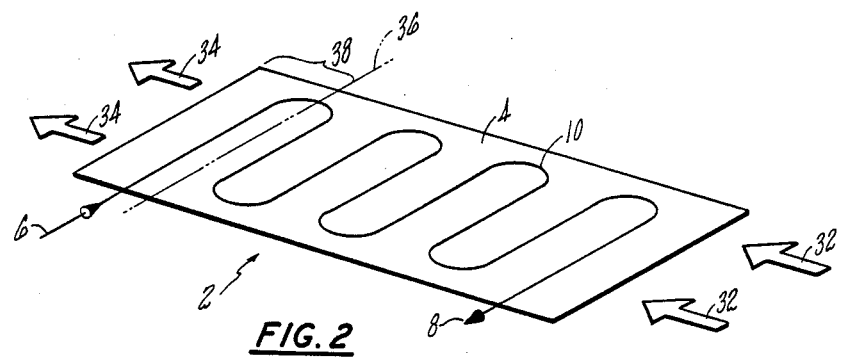
FIG. 2 is a schematic representation of a coolant plate showing the general flow path of the coolant therethrough along the superposed flow path of the oxidant gas.

By way of example, the following is illustrative of some operating temperatures whcch may be targeted and used in the loop. The stack cells will be operated at a temperature of about 400° F. The water coolant saturation temperature will be about 375° F. and water pressure at 185 psi. The subcooled temperature of the water subsequent to the heat exchanger but prior to the coolant inlet will be targeted at about 350° F. Thus, the water coolant will enter the stack cooling passages at a nominal 350° F. whereupon the temperature of the water will steadily rise to the saturation temperature of 375° F., at which the water will boil, creating steam as it passes through the remainder of the cooling passages in the stack. Thus the portion of the cells which is cooled by the intially entering water will be cooler than the rest of the cell area. The oxidation flow path, which in the case of an acid cell system is the cathode air flow path, will be arranged so that the air flows into the stack cells adjacent to the coolant outlet 8, as denoted by arrows 32 in FIGS. 1 and 2, and the cathode exhaust flows out of the cells adjacent to the coolant inlet 6 as denoted by arrows 34 in FIGS. 1 and 2. In FIG. 2, the broken line 36 is used to denote the inner edge of the portion of the cells which is cooler by reason of not being cooled by liquid at the saturation temperature. Thus, the portion 38 of the cells is the condensation zone wherein cathode gases are cooled prior to exiting the stack and wherein acid which has vaporized into the cathode gases will condense back out again to reenter the electrolyte matrix. Preferably, the portion of the cells which is to the right of the broken line 36, as viewed in FIG. 2, will be where the electrochemical reaction takes place, and will also be cooled substantially entirely isothermally. The portion of the cells which is to the left of the broken line 36, as viewed in FIG. 2, will be substantially free of electrochemical reaction, and will include a matrix extension onto which acid can condense and be wicked back into the electrochemically active part of the cells.

Figure 3:
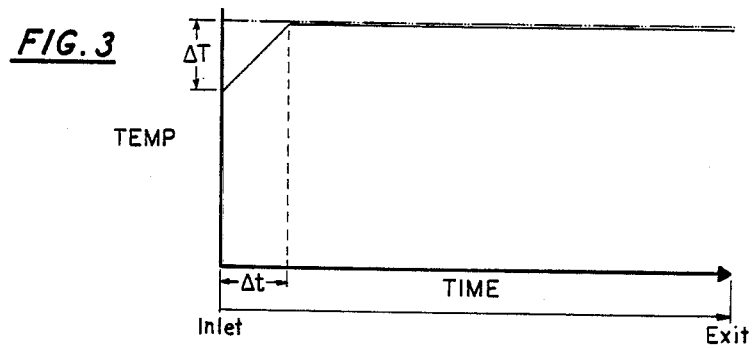
FIG. 3 is a graphic representation of the thermal profile of the coolant as it passes through the coolant plates.

Referring to FIG. 3, there is shown a graphic representation of coolant temperature T versus the time it takes for the coolant to pass through the stack from the inlet 6 to the outlet 8. The temperature time relationship for the prior art all isothermal cooling format is shown in phantom lines, and the preheating plus partial isothermal cooling format of this invention is shown in solid lines. It will be noted that the addition of makeup water to the prior art all isothermal cooling format will lower the temperature of the water entering the coolant inlet on the order of two or three degrees F, but that the return to the isothermal boiling temperature is very quick and does not result in any appreciable subcooled time span. In FIG. 3 $\Delta T$ represents the number of degrees below the isothermal boiling temperature at which the subcooled entry temperature is located, and $\Delta t$ represents the time span that it takes the subcooled water to reach the isothermal boiling temperature as the water passes through the coolant passages in the stack. $\Delta T$ is controlled by the heat exchanger 22 and the control valve 26, and $\Delta t$ is controlled by the flow rate of the coolant water in the cooling passages. Thus, one merely need select a ΔT which provides for sufficient cooling to cause the acid vapor to condense out of the cathode gases prior to leaving the cell plate area, and a Δt which will create a well defined condensation zone in the cell plate area adjacent to the electrochemically active part thereof.

It will be readily appreciated that the fuel cell stack cooling loop system of this invention can be formed with conventional components and will ease packaging or housing limitations previously imposed upon power systems which utilized steam condensation in the rejection of heat in coolant being returned to the stacks. There are fewer components than with the prior art, and the problem of electrolyte loss through evaporation is dealt with. Using the electrolyte condensation recovery abilities of this invention, electrolyte life can be doubled in a stack operating in otherwise normal conditions. Very accurate control of coolant reentry temperatures is accomplished with the system of this invention through the use of the interacting temperature sensor and coolant flow control valve.

Since many changes and variations in the disclosed embodiment of the invention may be made without departing from the inventive concept, it is not intended to limit the invention otherwise than as required by the appended claims.

We claim:

1. A fuel cell stack cooling using a water coolant comprising:
   (a) coolant passages in the stack, said coolant passages having an inlet end and an outlet end for receiving water and discharging a water/steam mixture respectively, said coolant passages in counterflow relationship to oxidation gas flowing through the stack;
   (b) a steam separator;
   (c) a first conduit at said coolant passage outlet end for conveying the water/steam mixture from said stack to said steam separator, wherein the water and steam are separated from each other;
   (d) a second conduit conveying steam from said steam separator to a catalytic fuel reformer;
   (e) a heat exchanger for removing heat from water passing therethrough;
   (f) a third conduit at said steam separator for conveying water from said steam separator to said heat exchanger operable to lower the temperature of the water;
   (g) a fourth conduit at said heat exchanger for conveying water from said heat exchanger to said inlet end of said coolant passages thereby forming a coolant loop;
   (h) a pump for circulating coolant through said loop;
   (i) modulating means for modulating the heat removed by said heat exchanger;
   (j) sensor means for sensing a measure of the temperature of the water in the steam separator; and
   (k) control means responsive to said sensor means for varying said modulation means to maintain said measure of temperature at a preselected value.

2. The cooling system of claim 1 further comprising a makeup water conduit for introducing makeup water into said third conduit between said sensor and said heat exchanger.

3. The cooling system of claim 2:
   said pump located in said third conduit, and said makeup water conduit connected to said third conduit between said steam separator and said pump.

4. The cooling system of claim 1:
   said sensor means for sensing a measure of the temperature of water in said separator comprising a temperature sensor located to sense the temperature of water flowing from said steam separator.

5. The cooling system of claim 1:
   said modulating means including a bypass conduit around said heat exchanger interconnecting said third and fourth conduits, and an adjustable valve to vary the proportion of water passing through said heat exchanger.

6. The cooling system of claim 5 wherein said adjustable valve means is a three way valve.

* * * * *

UNITED STATES PATENT AND TRADEMARK OFFICE
CERTIFICATE OF CORRECTION

PATENT NO. : 4,824,740
DATED : April 25, 1989
INVENTOR(S) : Martin L. Abrams et al It is certified that error appears in the above-identified patent and that said Letters Patent is hereby corrected as shown below:

Claim 1, Column 5, Line 29  After "stack cooling" insert --system--

Signed and Sealed this

Eighth Day of September, 1992

*Attest:*

DOUGLAS B. COMER

*Attesting Officer*    *Acting Commissioner of Patents and Trademarks*